United States Patent [19]

Strackbein

[11] 3,815,495

[45] June 11, 1974

[54] MODULUS 10 NUMBERING MACHINE

[76] Inventor: Gilbert E. Strackbein, 96 Broadmoor Dr., Little Rock, Ark. 72204

[22] Filed: Mar. 9, 1973

[21] Appl. No.: 339,859

[52] U.S. Cl..... 101/76, 340/146.1 AJ, 235/153 BB, 101/79, 178/23 A, 235/61.7 A

[51] Int. Cl. ........ B41l 45/00, G06f 11/00

[58] Field of Search ......... 340/146.1 AG, 146.1 AJ, 340/146.1 R; 235/153 R, 153 BB, 61.7 A, 133 A, 134, 135; 101/72, 75–81; 178/23 A

[56] References Cited

UNITED STATES PATENTS

| | | | |
|---|---|---|---|
| 3,030,020 | 4/1962 | Reynolds, Jr. | 340/146.1 AJ X |
| 3,140,465 | 7/1964 | Rakoczi | 340/146.1 AG X |
| 3,183,482 | 5/1965 | Aberth et al. | 340/146.1 AJ X |
| 3,278,725 | 10/1966 | Gunst | 101/72 X |
| 3,456,238 | 7/1969 | Peddle | 340/146.1 AG |
| 3,474,956 | 10/1969 | Cain | 340/146.1 AG X |
| 3,571,581 | 3/1971 | Kaus et al. | 340/146.1 AJ |
| 3,603,251 | 9/1971 | Elsworth | 101/76 |
| 3,624,730 | 11/1971 | Gottscho | 101/76 X |
| 3,650,205 | 3/1972 | Wybrow et al. | 101/72 |
| 3,686,629 | 8/1972 | Yu | 340/146.1 AJ |
| 3,711,830 | 1/1973 | Van Dersel | 340/146.1 AJ |
| 3,732,407 | 5/1973 | Brewster et al. | 235/153 BB |
| 3,734,010 | 5/1973 | Le Gault et al. | 101/79 |

OTHER PUBLICATIONS

IBM Technical Disc. Bulletin Vol. 1, No. 6, Apr. 1959, "Parity Check Circuit"

IBM Tech. Disc. Bulletin Vol. 10, No. 12, May 1968, "Printing Numbering Head For Self-Checking Number, Modulus-11.

IBM Tech. Disc. Bulletin Vol. 7, No. 11, Apr. 1965, "Modulo-10 Self-Checking Number System".

*Primary Examiner*—Robert E. Pulfrey
*Assistant Examiner*—E. H. Eickholt
*Attorney, Agent, or Firm*—Cushman, Darby & Cushman

[57] ABSTRACT

An improved numbering machine of the type having 5 or 10 conventional numbering heads mounted about a shaft coupled to a press or collator drive-train so that each of the heads is presented sequentially to provide a unique number for each of a number of sequentially presented documents or the like. Each of the heads has a first operating arm incrementing the number presented and riding in a groove of a first cam member having a portion actuating the first arms for each shaft rotation and a second operating arm incrementing or decrementing a parity digit presented by a parity digit wheel on each head. The second arms likewise ride in a groove of a second cam member having a plurality of solenoids each with a plunger member which can be moved into the groove to a position actuating the second arms so that the parity digit is incremented or decremented by one unit for each plunger in the groove. A further cam member rotates with the shaft and supplies signals to a counting and logic circuit which controls the solenoids to provide the correct modulus 10 parity coded digit.

6 Claims, 11 Drawing Figures

MODULUS 10 NUMBERING MACHINE

BRIEF DESCRIPTION OF THE PRIOR ART AND SUMMARY OF THE INVENTION

The invention relates to an improved numbering machine for providing for each of a number of presented documents or the like a unique number identifying the document together with a parity digit.

Many types of numbering machines are now in use for providing identifying numbers on printed documents, such as books, pamphlets, booklets, single sheets, business forms and the like. Normally, the numbering machine is coupled to the press so that the identifying number which is printed on the document is incremented once for each document presented.

Frequently, in numbering documents and other things it is desirable to provide a single parity digit which is generated mathematically from the other digits defining an identifying number, and which can thereafter be used to make sure that the other digits are correct after the number has been entered, for example, in a digital computer or other similar machine. A number of codes are available and widely used for generating parity digits through different mathematical operations.

One system for generating a parity digit which has been widely used and accepted is generally termed the modulus 10 parity coding system. This sytem works as follows: For a given number, beginning with the least significant digit and using each odd digit, a number is formed. This number is then doubled and the digits comprising this doubled number summed. The even digits are also summed, and the two sums added together to form a third number. This third number is then subtracted from the next higher order of ten with the remainder being the parity check digit.

To give an example, the modulus 10 check digit for the number 123456 is formed as follows: The odd digits in this number are 6, 4 and 2 with 6 being the least significant digit. Thus, the number formed in the first step from the odd digits is 246, doubling this number generates the number 492 and adding the digits in that product $4 + 9 + 2 = 15$. Adding the even digits $1 + 3 + 5 = 9$ and when these two sums are totalled $15 + 9 = 24$. Subtracting 24 from the next highest order of 10, which is 30, yields 6. Thus, according to the modulus 10 code, the parity check digit for the number 123456 is 6. Normally this number is added to the right of the identifying number making the complete number appear as 1234566.

The present invention relates to an improved numbering machine of the type having five or ten conventional numbering heads mounted about a shaft which is coupled to a press or collator drive train so that each of the heads is sequentially presented in turn to impart or provide a unique number for each of a number of sequentially presented documents. The present invention relates to a simple modification of this type of system which automatically presents and provides the correct parity digit according to the modulus 10 system.

The conventional numbering head is modified to provide a second operating arm which is actuated to increment a parity digit wheel while the coventionally provided operating arm on each head is used to increment the number provided by the remainder of the wheels and defining the identification number for the document or other object. The numbering heads are mounted between two fixed cams which each provide a groove in which the respective first and second operating arms of the five or ten numbering heads ride. The operating arms which increment the number identifying the document ride in the groove of a first cam member so that each of the heads is incremented to sequentially provide numbers incremented by a unit for each document or the like presented. The operating arms which operate the parity check digit wheel ride in a groove of the second cam which has associated with it a plurality of solenoids, each having a plunger member which is movable into and out of the groove under the control of an associated solenoid. The operating arms associated with the parity check digit wheels are each actuated once for each plunger encountered in the groove to increment or decrement the check digit wheel by one unit.

These solenoids, which number four in the particular embodiment of the invention described in detail below, are controlled by a counting and logic circuit which receives signals from a further cam member mounted for rotation with the shaft which completes one rotation, in the particular embodiment described with five heads, for each five documents presented. The logic further includes a plurality of sets of flip-flops with each set defining a counter. One set of flip-flops actuates a first solenoid during every other revolution, while a second plurality of flip-flops connected to a logic AND gate provide an output to a relay actuating a second relay following the counting of each 20 rotations and deactuating the second relay following the 21st counted revolution. A further logic gate also activates the second solenoid between each 20th and 21st revolution counted which represents the interval where between 95 and 99 documents are presented. A further counting circuit provides an output activating a relay to cause an associated third solenoid to move its plunger member into the cam groove between each 495 and 499 documents, representing the interval between dectection of the 100th revolution and detection of the 101st revolution. Finally, a further counter provides an output operating the third solenoid and a fourth solenoid after each 9995 documents have been presented and when the count has reached 10,000 or an integral multiple thereof and before it reaches 10,001.

Thus the logic and counting circuit increments each parity digit wheel of the five heads mounted about the rotating shaft once for each two revolutions of the shaft between zero and 20 revolutions. Between the 20th and 21st revolution the count is incremented by two units and between the 100th and 101st revolution by three units. Between the 2000th and 2001 revolution, the parity check digit wheel is incremented by four digits. This simple counting and logic circuit provides the correct modulus 10 digit for five numbering heads mounted about a shaft driven by the press or collator drive train so that each of the numbering heads is presented and may be used to print a unique number identifying a document together with the correct parity digit on each document presented.

DETAILED DESCRIPTION OF THE DRAWINGS

Figure 1:
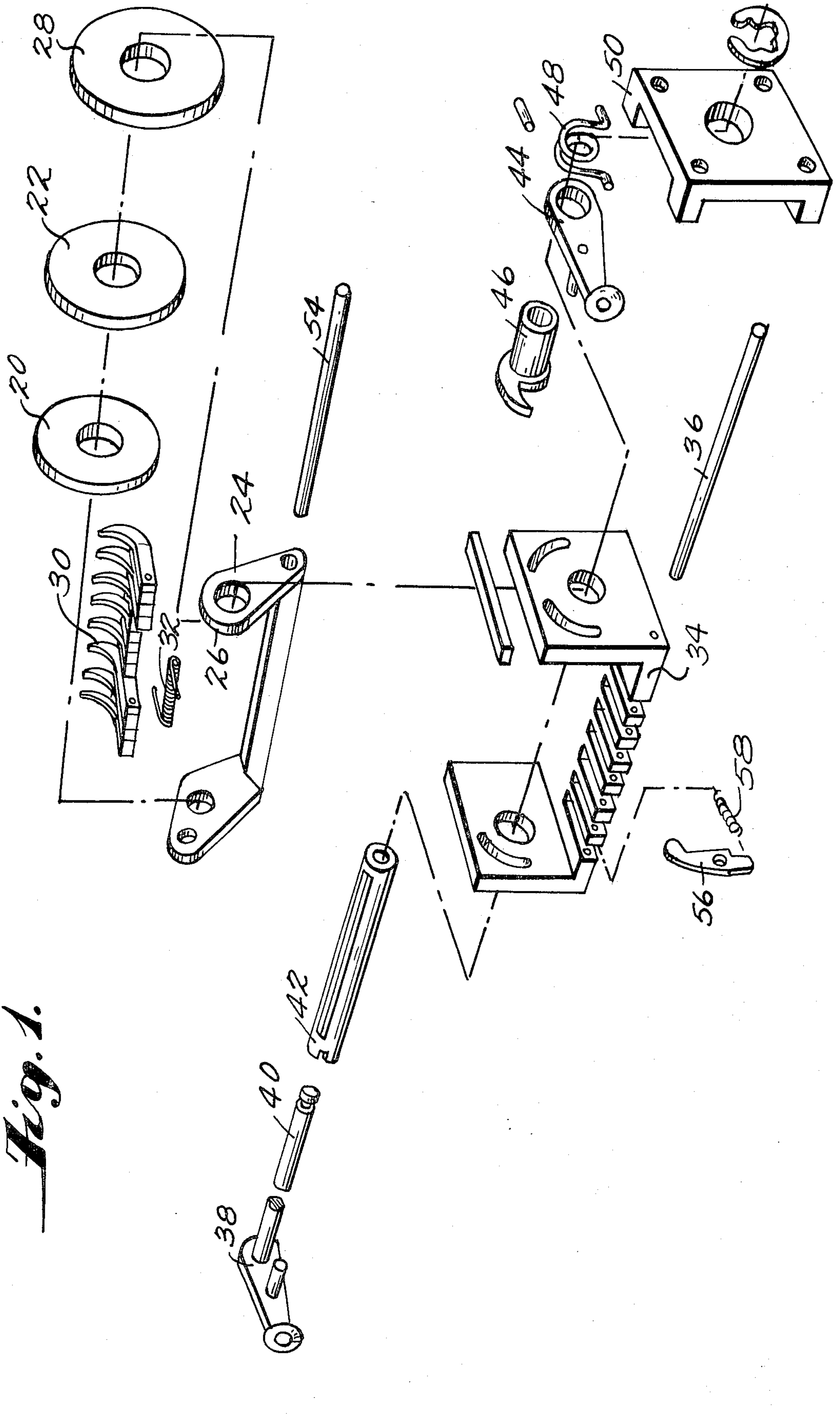
FIG. 1 shows an exploded view of a conventional numbering head modified to add an operating arm and associated structure for providing a modulus 10 parity check digit.

Reference is now made to FIG. 1 which illustrates an exploded view of a conventional numbering head adapted to be mounted with four other number heads about a shaft for sequentially presenting with the other heads identifying numbers for documents or the like, each incremented by one from the last presented number. The numbering head shown in exploded view in FIG. 1 comprises a number of conventional digit wheels of which wheels 20 and 22 are represented. These wheels are mounted between a conventional swing 24 which has a corner 26 removed in order to provide room for the operating arm for the check digit wheel as discussed below. A number of conventional pawls 30 are operated by a spring 32 and held in swing member 24 on pin 54. Pawls 30 are actuated by an operating arm 38 which is coupled to the pawls by a shaft 40 which rides in a sleeve 42. To modify a conventional numbering head, shaft 40 is lengthened slightly while sleeve 42 is shortened.

An extension 50 is provided for case 34 and houses parity operating arm 44 which is coupled to an actuating pawl 46 for parity check wheel 28. A tension spring 48 is provided for re-setting operating arm 44. A further pin 36 hold locking member 56, operated by spring 58, within case 34. The plurality of wheels, for example, six, defining the unique identifying number which is incremented by one unit for each document presented, are actuated conventionally by operating arm 38, while operating arm 44 is operated to increment or decrement the number presented by check parity digit wheel 28 by one unit.

To modify a conventional numbering head, the actuating pawl for the least significant digit is preferably removed so that the second wheel from the left becomes the unit position and the wheel which was previously the least significant digit becomes the parity digit wheel and is operated by operating arm 44. Thus, the parity check digit wheel is free-running and in no way connected to or interfered by the other number wheels.

Figures 2, 3:
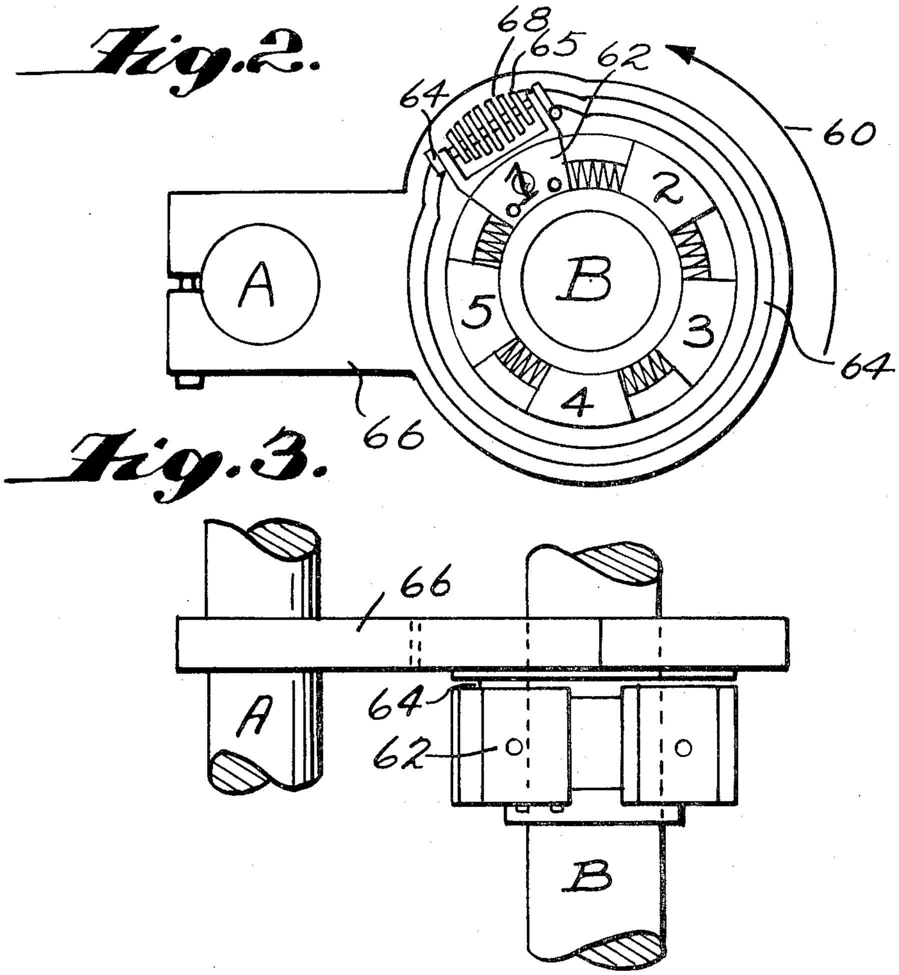
FIG. 2 shows a cut-away view of a number of conventional numbering heads such as shown in FIG. 1 mounted about a shaft for rotation therewith to sequentialy present identifying numbers and parity digits.
FIG. 3 is a top view of the arrangement in FIG. 2.
Figure 4:
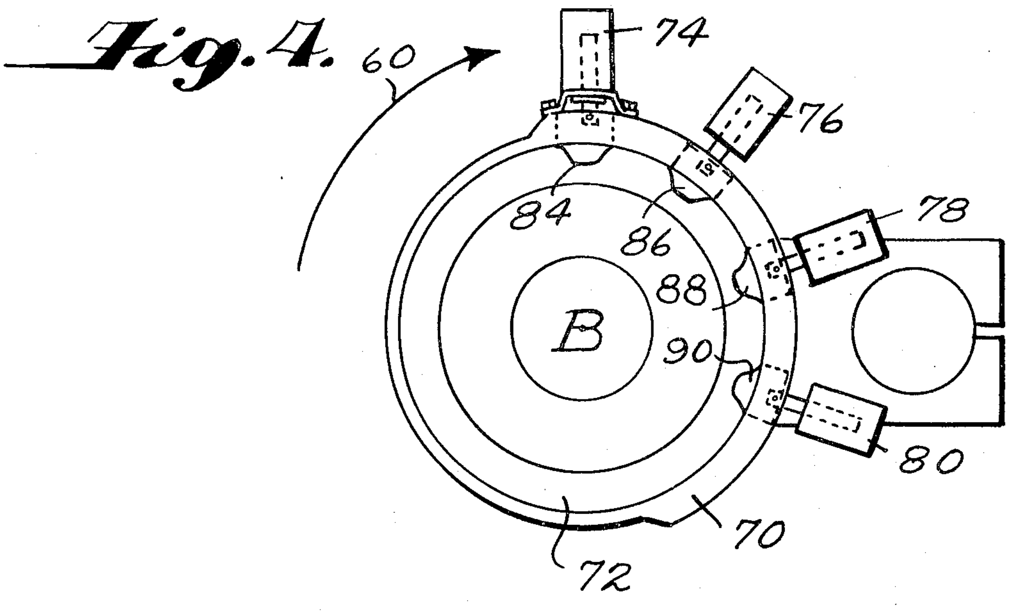
FIG. 4 shows a view of the arrangement for incrementing the parity check digit wheel.
Figure 5:
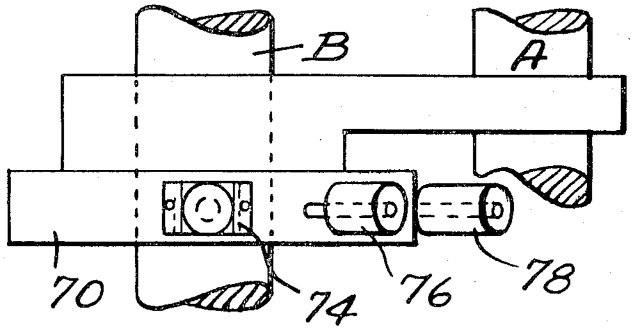
FIG. 5 shows a top view of the structure of FIG. 4.
Figure 6:
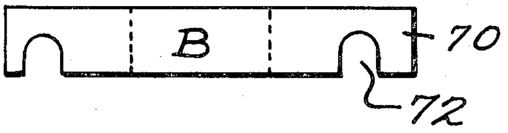
FIG. 6 shows a cut-away view of the grooved cam.

Reference is now made to FIG. 2 which illustrates an end view of a numbering machine which comprises a plurality of numbering heads such as illustrated in FIG. 1, namely, five such numbering heads, mounted about a shaft labelled B which rotates in the direction of arrow 60, for example, for printing with each of the numbering heads in turn as each of a number of documents or the like are sequentially presented. Shaft A is a nonrotating shaft which is used to provide a "throw-off" situation, allowing the press or collator to advance without incrementing the numbering head. In the embodiment of FIG. 2 only one of the heads labelled 62 is completely illustrated. As shown, the operating arm 64 of head 62, which corresponds to operating arm 38 in FIG. 1, rides in a groove 65 defined in cam member 66 which is fixed so that shaft B and the associated five numbering heads, including numbering head 62, rotate about cam member 66. As each of the numbering heads and the operating arms riding in groove 65 pass through portion 68 in turn, each operating arm is actuated to increment the number identifying the document or the like by a number sufficient that the correct number will be presented the next time that head 62 is presented for numbering a document. Thus, with five numbering heads disposed around the shaft B, each head must be incremented as it passes portion 68 to display a number which is incremented by five. The numbering heads mounted on shaft B are mounted between cam 66 and a second cam 70 which can be best seen in FIGS. 4–6. Cam 70, like cam 66, is likewise provided with a groove 72 with the operating arm of each of the numbering wheels which increments the parity check digit wheel riding in groove 72 in the same fashion as the operating arms associated with the regular numbers ride in groove 65 of cam member 66.

Figure 7:
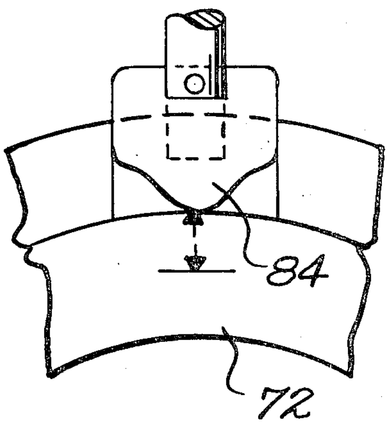
FIG. 7 shows a cut-away view illustrating the plunger member which moves into the cam member shown in FIGS. 4–6.
Figures 8, 9:
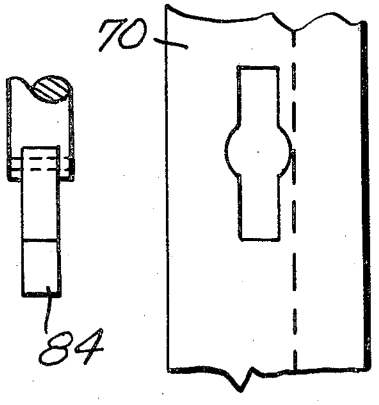
FIG. 8 shows a side view of the plunger of FIG. 7.
FIG. 9 shows a cross-sectional view of the cam member of FIG. 5.

Four solenoids 74, 76, 78 and 80 are mounted about the periphery of cam member 70 and are provided with respective plunger portions 84, 86, 88 and 90 which are movable in and out of groove 72 as illustrated in FIGS. 7 and 8. When a plunger member, for example, plunger member 84 in FIGS. 7 and 8, is in groove 72, each operating arm which passes that plunger member is actuated to increment or decrement the parity digit wheel by a unit. Thus, the parity digit wheel can be incremented by zero, one, two, three or four units for each rotation of shaft B depending on the number of solenoids 74, 76, 78 or 80 actuated. Each rotation of shaft B represents the presentation of five documents and the presentation of five unique members by the numbering heads mounted about shaft B. As will be clear from the following discussion, the operation of solenoids 74, 76, 78 and 80 can be simply effected to increment the parity check digits to the correct values.

Figures 10, 11:
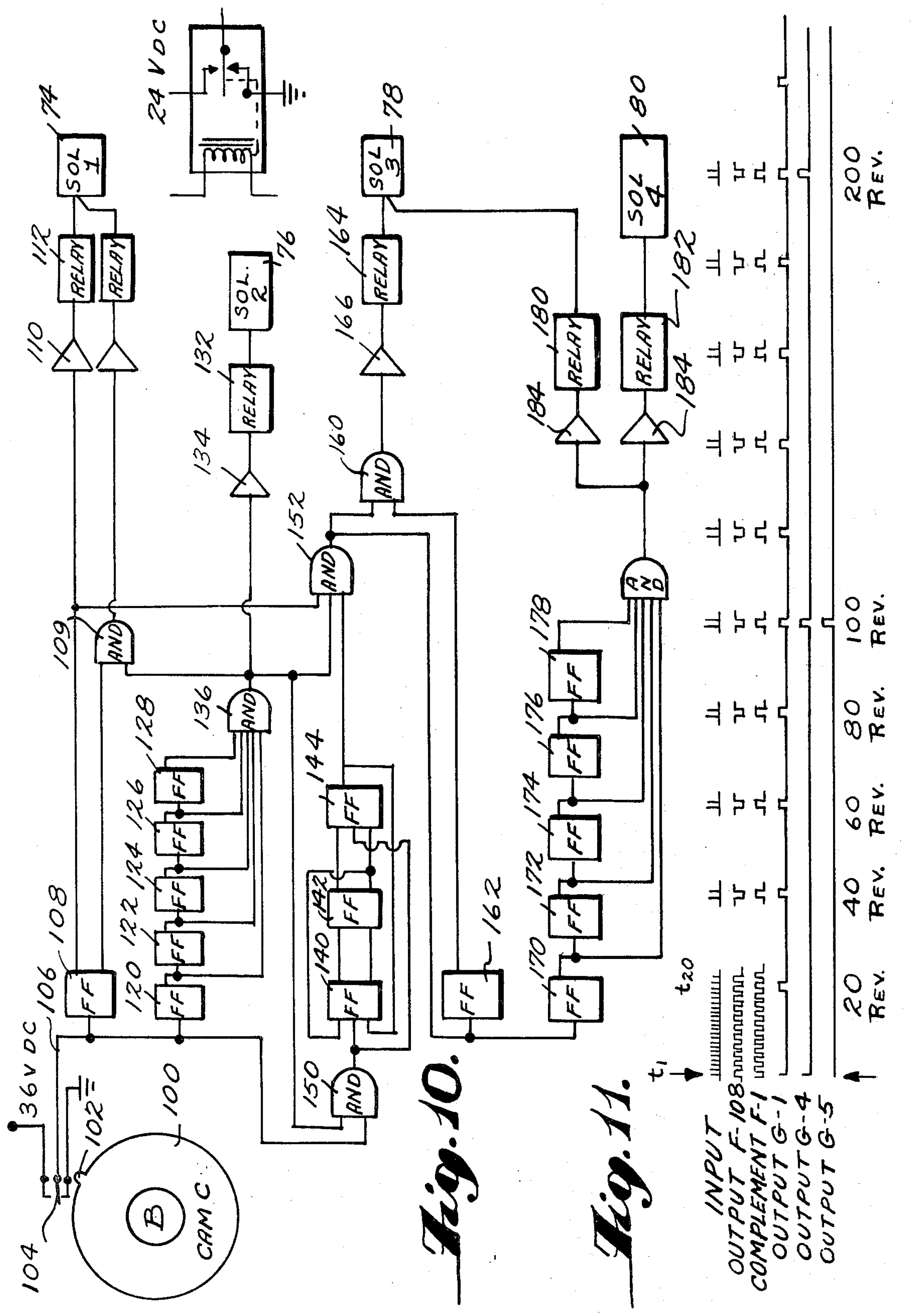
FIG. 10 shows a schematic view of the logic and counting circuit for controlling the solenoids which move their plunger members into the groove of the cam member in FIG. 5.
FIG. 11 shows a schematic of some of the signals produced by the circuit of FIG. 10.

Reference is now made to FIG. 10 which illustrates a simple logic and counting circuit for controlling the operations of solenoids 74, 76, 78 and 80. A further cam member 100 is mounted about shaft B for rotation therewith and provided with a cam portion 102 on the exterior surface thereof which operates to shift the position of a switch 104 once for each rotation from its illustrated position to a position connecting line 106 to a source of positive voltage, for example, 3.6 volts, rather than ground. Each time switch 104 shifts from its illustrated position connecting line 106 to the positive voltage source, flip-flop 108 shifts its output condition as illustrated in FIG. 11. One output of flip-flop 108 is connected via amplifier 110 to a relay 112 which operates solenoid 74 so that for every other revolution solenoid 74 is operated to cause its associated plunger member 84 to move into groove 72 to operate the operating arms associated with the parity digit wheel of each of the five numbering heads mounted about shaft B.

Line 106 is also connected to a plurality of flip-flops 120, 122, 124, 126 and 128 which are connected to define a counter which provides an output for each 20 input signals. AND gate 136 is connected to the output of flip-flops 120, 122, 124, 126 and 128 to provide an enabling output signal to relay 132 via amplifier 134 to operate solenoid 76 after each 20th revolution.

A further set of flip-flops 140, 142 and 144 are connected as a counter to provide an output for each five input signals. Flip-flops 140, 142 and 144 are connected to line 106 and to the output of AND gate 136 via AND gate 150 so that flip-flops 140, 142 and 144 provide an enabling signal to AND gate 152 between the 100th and 101st revolution. The other inputs to AND gate 152 are connected to the output of AND gate 136 and the output of flip-flop 108. These second signals provide a redundancy check. The output of AND gate 152 is applied to an AND gate 160 together with the output of flip-flop 162 to provide a signal to operate relay 164 via amplifier 166 between the 100th and 101st revolution between the 300th and 301st revolution between the 500th and 501st revolution, etc.

A final set of flip-flops 170, 172, 174, 176 and 178 are connected as a further counter to provide an output for each twenty input signals. Flip-flops 170, 172, 174, 176 and 178 are connected to the output of AND gate 152 so that relays 180, 182 are activated by respective amplifiers 184 and 186 to operate solenoids 78 and 80 between the 2,000th and 2,001st revolutions.

The simple logic circuitry illustrated in FIG. 10 will increment and decrement the parity digit wheel correctly to provide the desired modulus 10 code with five numbering heads mounted about a shaft for sequential operation as discussed above. The unit will provide a correct parity digit for any number from zero through 999,994 with no further adjustments except a manual re-set for the numbers 49,995 through 49,999. Simple circuitry can be added to provide the same function as the manual re-set.

In order to initiate numbering, the numbering heads in the order which they are used should have the following numbers set into them:

| | |
|---|---|
| Head number 1 | 0000000 |
| Head number 2 | 0000018 |
| Head number 3 | 0000026 |
| Head number 4 | 0000034 |
| Head number 5 | 0000042 |

Flip-flop 108 is next set to the re-set state providing an output to enable AND gate 109. With the device off, the shaft is rotated to ink the numbers on the heads.

It is simple to demonstrate why this circuitry operates to provide the correct digits. For example, taking the head which prints the numbers 5, 10, 15, 20, 25, etc., it can be easily shown that for the numbers 5 and 10, the parity digit is 9 while for 15 and 20 the parity digit is 8, for 25 and 30 the parity digit is 7. For 35 and 40, the parity digit is 6, for 45 and 50, the parity digit is 5, for 55 and 60, the parity digit is 4, for 65 and 70, the parity digit is 3, for 75 and 80, the parity digit is 2, for 85 and 90, the parity digit is 1, for 95, the parity digit is 0, and for 100 the parity digit is 8. Thus the parity digit wheel for this numbering head needs only be decremented by one up to a count of 95 before number of 100 is presented for printing the parity digit wheel must be decremented by two units and the circuitry of FIG. 10 accomplishes that result. It can be further demonstrated that the circuitry will provide the correct digits at least up to 49.994. For operation beginning with number 50,000 the parity digit will be decremented by 4 for each 2,000 revolutions through number 999,994. Thereafter, at each 1,000,000 numbers or 200,000 revolutions the parity digit must be decremented by 6, except that at number 4,999,995 through 4,999,999 the parity digit must be decremented by 7.

This simple numbering machine is capable of operating on many different types of press equipment and/or collators. The equipment can be used on rotary presses, stop-and-go presses, single-sheet presses or any semi-automatic or fully automatic printing press or collator. Many changes and modifications in the above-described embodiment of the invention can be, of course, be made without departing from the scope of the invention. Accordingly, that scope is intended to be limited only by the scope of the appended claims.

What is claimed is:

1. A numbering machine providing a succession of incremental numbers each having a parity check digit comprising:

a plurality of numbering heads each having a plurality of digit wheels defining one of said numbers, a first operating arm for incrementing the number defined by said digit wheels, a parity check digit wheel for presenting a parity digit and a second operating arm for incrementing or decrementing the parity check digit presented, shaft means rotating a complete rotation each time a given number of things to be numbered are presented, that given number being the same as the number of numbering heads, means for mounting said heads about said shaft means so that one of said heads is presented for numbering each time one of said things to be numbered is presented, a first cam member mounted about said shaft means and having a groove in which the first arms of said heads ride and a groove portion for actuating each of said first arms for each rotation of said shaft means to increment the number defined so that said heads each present in turn a number incremented by a unit from the last number presented, a second cam member mounted about said shaft means and having a groove in which said second arms of said heads ride, a plurality of plunger members mounted about said second cam member and each having a portion movable into said groove of said second cam member to a position in which that portion actuates each of said second arms to increment or decrement by one unit the parity check digit presented by the parity check digit wheel associated with that second arm, a third cam member mounted for rotation with said shaft means and providing a signal upon each rotation of said shaft means and counting means for receiving said signal provided by said third cam member, maintaining a count thereof and causing a combination of plunger members to move their associated portions into the groove of said second cam member to increment or decrement said parity check digit wheels by a number of units equal to the number of portions moved into said groove of said second cam member to present the correct parity digits.

2. A machine as in claim 1 wherein said heads are mounted for rotation with said shaft means.

3. A machine as in claim 1 wherein the number of said heads is five and said shaft means rotates once for each five things presented.

4. A machine as in claim 3 wherein said counting means increments said parity check digit wheels in accordance with a modulus 10 code, and wherein the number of said solenoids is four.

5. A machine as in claim 4 wherein said counting means includes:

first means for actuating a first solenoid following every odd revolution of said shaft and deactuating following every even resolution, second means for actuating said first solenoid following every 20th revolution and deactuating following every 21st revolution, third means for actuating a second solenoid following every 20th revolution and deactuating following every 21st revolution, fourth means for actuating a third solenoid following every one hundreth revolution and deactuating following every one hundreth and first revolution, and fifth means for actuating said third solenoid and a fourth solenoid following said two thousandth and first revolution and deactuating said third and fourth solenoids following said two thousandth and second revolution.

6. A machine as in claim 5 wherein said first means includes a first flip-flop with its input connected to said third cam member for shifting from one output state to another for each revolution of said third cam member and its output connected to said first solenoid, wherein said third means includes a plurality of flip-flops connected as a counter with inputs connected to said third cam member and first gate means connected to said second solenoid for providing an actuating signal when the count in said flip-flops connected as a counter reaches twenty, wherein said second means includes second gate means connected to said first gate means and said first flip-flop and to said first solenoid, wherein said fourth means includes a further plurality of flip-flops connected as a counter, third gate means connected to said further plurality of flip-flops and to said first gate means and said third cam member, and fourth gate means connected to said further plurality of flip-flops and to said second gate means and said first flip-flop for providing an actuating signal between the one hundreth and one hundreth and first revolution and wherein said fifth means includes another plurality of flip-flops connected as a counter and gate means connected to said another plurality for actuating said third and fourth solenoids.

* * * * *